United States Patent
Safavi Naeini et al.

(10) Patent No.: US 9,451,470 B2
(45) Date of Patent: Sep. 20, 2016

(54) METHOD AND APPARATUS FOR PROTECTING RADARS FROM INTERFERENCE

(71) Applicant: NOKIA CORPORATION, Espoo (FI)

(72) Inventors: Hossein Ali Safavi Naeini, Schererville, IN (US); Chittabrata Ghosh, Fremont, CA (US); Klaus Doppler, Albany, CA (US); Sumit Roy, Bothell, WA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 202 days.

(21) Appl. No.: 14/316,500

(22) Filed: Jun. 26, 2014

(65) Prior Publication Data

US 2015/0382357 A1    Dec. 31, 2015

(51) Int. Cl.
*H04W 16/16* (2009.01)
*H04W 16/14* (2009.01)

(52) U.S. Cl.
CPC ............ *H04W 16/16* (2013.01); *H04W 16/14* (2013.01)

(58) Field of Classification Search
CPC . H04J 14/0227; G01S 7/417; H04Q 11/0062
See application file for complete search history.

(56) References Cited

U.S. PATENT DOCUMENTS

| | | | |
|---|---|---|---|
| 8,477,716 B2* | 7/2013 | Gossain | H04L 1/0026 370/331 |
| 9,226,191 B1* | 12/2015 | Vivanco | H04W 28/0231 |
| 9,247,287 B2* | 1/2016 | Seo | H04N 21/43637 |
| 2003/0198200 A1 | 10/2003 | Diener et al. | |
| 2004/0151137 A1 | 8/2004 | McFarland et al. | |
| 2006/0028376 A1 | 2/2006 | Theobold et al. | |
| 2009/0052371 A1 | 2/2009 | Ariyur | |
| 2009/0093267 A1 | 4/2009 | Ariyur | |
| 2009/0268619 A1 | 10/2009 | Dain et al. | |
| 2012/0309441 A1 | 12/2012 | Eriksson et al. | |

OTHER PUBLICATIONS

International Search Report application No. PCT/US 15/31704 mailed Aug. 20, 2015.

* cited by examiner

*Primary Examiner* — Chandrahas Patel
(74) *Attorney, Agent, or Firm* — Squire Patton Boggs (US) LLP

(57) ABSTRACT

A method and apparatus may be configured to determine a plurality of rings. The plurality of rings surround a radar, and the plurality of rings encompass a plurality of networks surrounding the radar. The method also includes determining transmission powers corresponding to the plurality of rings. Each ring is associated with a determined transmission power. The method also includes instructing each network of the plurality of networks to perform transmissions in accordance with the determined transmission powers. Each network is instructed to use the determined transmission power that corresponds to the ring which encompasses that network.

18 Claims, 9 Drawing Sheets

METHOD AND APPARATUS FOR PROTECTING RADARS FROM INTERFERENCE

BACKGROUND

1. Field

Embodiments of the invention relate to protecting radars from interference using transmission control.

2. Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include determining, by a management node, a plurality of rings. The plurality of rings surround a radar. The plurality of rings encompass a plurality of networks surrounding the radar. The method may also include determining transmission powers corresponding to the plurality of rings. Each ring is associated with a determined transmission power. The method may also include instructing each network of the plurality of networks to perform transmissions in accordance with the determined transmission powers. Each network is instructed to use the determined transmission power that corresponds to the ring which encompasses that network.

In the method of the first embodiment, the determining the plurality of rings comprises determining the plurality of rings by a radio-management-service device.

In the method of the first embodiment, the determining the plurality of rings comprises determining a plurality of concentric rings.

In the method of the first embodiment, the determining the plurality of rings includes determining a maximum radius value of each ring, and the maximum radius value is based on a desired distribution of pathlosses within each ring.

In the method of the first embodiment, the determining the transmission powers corresponding to the plurality of rings includes determining transmission powers that are equal to each other or assigning higher transmission power to rings closer to the radar.

In the method of the first embodiment, the method may also include assigning a sensing schedule for a requesting network of the plurality of networks. The sensing schedule comprises a sensing duration and a sensing periodicity. The assigning is at least in part based on a pathloss between the requesting network and the radar and an angular distance of the requesting network to the radar main beam.

According to a second embodiment, an apparatus may include at least one processor. The apparatus may also include at least one memory including computer program code. The at least one memory and the computer program code may be configured, with the at least one processor, to cause the apparatus at least to determine a plurality of rings. The plurality of rings surround a radar, and the plurality of rings encompass a plurality of networks surrounding the radar. The apparatus may also be caused to determine transmission powers corresponding to the plurality of rings. Each ring is associated with a determined transmission power. The apparatus may also be caused to instruct each network of the plurality of networks to perform transmissions in accordance with the determined transmission powers. Each network is instructed to use the determined transmission power that corresponds to the ring which encompasses that network.

In the apparatus of the second embodiment, the apparatus includes a radio-management-service device.

In the apparatus of the second embodiment, the determining the plurality of rings includes determining a plurality of concentric rings.

In the apparatus of the second embodiment, the determining the plurality of rings comprises determining a maximum radius value of each ring, and the maximum radius value is based on a desired distribution of pathlosses within each ring.

In the apparatus of the second embodiment, the determining the transmission powers corresponding to the plurality of rings comprises determining transmission powers that are equal to each other or assigning higher transmission power to rings closer to the radar.

In the apparatus of the second embodiment, the apparatus is further caused to assign a sensing schedule for a requesting network of the plurality of networks. The sensing schedule comprises a sensing duration and a sensing periodicity. The assigning is at least in part based on a pathloss between the requesting network and the radar and an angular distance of the requesting network to the radar main beam.

According to a third embodiment, a computer program product may be embodied on a non-transitory computer readable medium. The computer program product may be configured to control a processor to perform a process including determining, by a management node, a plurality of rings. The plurality of rings surround a radar, and the plurality of rings encompass a plurality of networks surrounding the radar. The process also includes determining transmission powers corresponding to the plurality of rings. Each ring is associated with a determined transmission power. The process also includes instructing each network of the plurality of networks to perform transmissions in accordance with the determined transmission powers. Each network is instructed to use the determined transmission power that corresponds to the ring which encompasses that network.

According to a fourth embodiment, a method may include determining, by a network node, that a spectrum is to be used for transmitting.

The spectrum includes a spectrum used by a radar. The method may also include transmitting information relating to the network node. The method may also include receiving an instruction to perform transmissions in accordance with a determined transmission power.

In the method of the fourth embodiment, the determining that a spectrum is to be used for transmitting comprises determining by a base station, a wireless-local-area-network access point, an evolved Node B, or a wireless-local-area-network station.

In the method of the fourth embodiment, the transmitting information relating to the network node comprises transmitting at least one of an identifier of the network node, a pathloss from the network node to the radar, coordinates of the network node, a load, a channel quality, and an aggregate power.

In the method of the fourth embodiment, the method also includes receiving a sensing schedule from a management node. The sensing schedule includes a sensing duration and a sensing periodicity that are at least in part based on a pathloss between the network node and the radar and an angular distance of the network node to the radar main beam.

According to a fifth embodiment, an apparatus includes at least one processor. The apparatus may also include at least one memory including computer program code. The at least one memory and the computer program code may be configured, with the at least one processor, to cause the apparatus at least to determine that a spectrum is to be used for transmitting. The spectrum includes a spectrum used by a radar. The apparatus may also be caused to transmit information relating to the apparatus. The apparatus may also be caused to receive an instruction to perform transmissions in accordance with a determined transmission power.

In the apparatus of the fifth embodiment, the apparatus includes a base station, a wireless-local-area-network access point, an evolved Node B, or a wireless-local-area-network station.

In the apparatus of the fifth embodiment, the transmitting information relating to the apparatus includes transmitting at least one of an identifier of the network node, a pathloss from the network node to the radar, coordinates of the network node, a load, a channel quality, and an aggregate power.

In the apparatus of the fifth embodiment, the apparatus is further caused to receive a sensing schedule from a management node. The sensing schedule comprises a sensing duration and a sensing periodicity that are at least in part based on a pathloss between the network node and the radar and an angular distance of the network node to the radar main beam.

According to a sixth embodiment, a computer program product may be embodied on a non-transitory computer readable medium. The computer program product may be configured to control a processor to perform a process including determining, by a network node, that a spectrum is to be used for transmitting. The spectrum comprises a spectrum used by a radar. The process also includes transmitting information relating to the network node. The process may also include receiving an instruction to perform transmissions in accordance with a determined transmission power.

BRIEF DESCRIPTION OF THE DRAWINGS

For proper understanding of the invention, reference should be made to the accompanying drawings, wherein.

DETAILED DESCRIPTION

Figure 1:
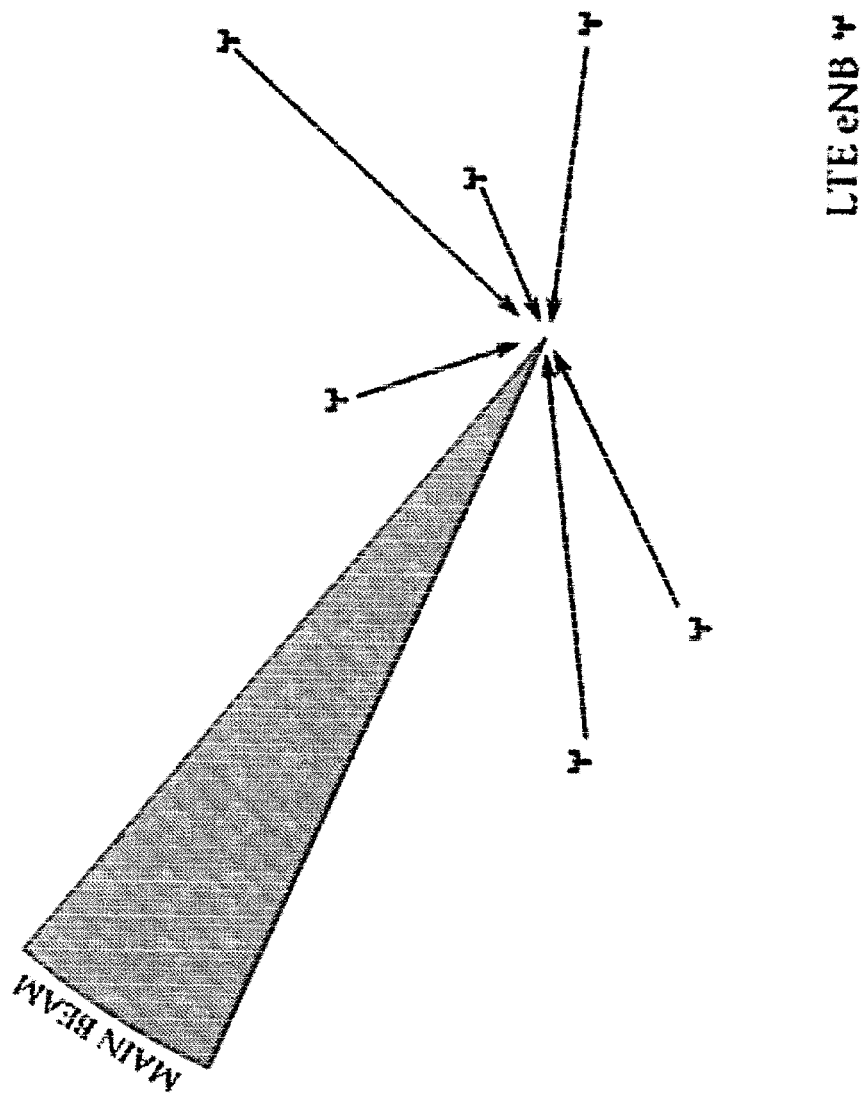
FIG. 1 illustrates a radar that is surrounded by a set of communication networks.

Embodiments of the invention relate to protecting radars from interference using transmission control. National governments have recently begun considering the possibility of providing opportunistic access to communication networks by opening up spectrum that was previously reserved for radars. If the spectrum is opened up, then it is important to protect the radars from any excessive interference that originates from the communication networks.

In order to enable coexistence of LTE networks with radars, the Federal Communication Commission (FCC) has defined a database-centric Shared Access System (SAS). SAS manages usage information of radar operations as well as usage information of registered LTE small cell networks. The SAS may include two databases, the Federal SAS (FSAS) and the Commercial SAS (CSAS). The FSAS may reserve the usage information of radars, and the CSAS may reserve usage information of LTE and Wi-Fi networks.

Monostatic radars present a unique situation among primary users in a dynamic access paradigm. Specifically, monostatic radars generally use a collocated radar transmitter and receiver. An opportunity exists to effectively use the available spectrum by exploiting location information, information about the radar, and other modeling techniques, while limiting an impact on radar systems.

Small cells (such as LTE Home eNBs (HeNBs), for example) are projected to be widely deployed in the future. Typically, a network operator centrally-manages the devices corresponding to these small cells, and the geographical locations of these devices is generally known. As such, these devices may be well-suited for performing dynamic access of a radar spectrum. The coverage ranges of such small cells will generally be home-wide/building-wide which, in turn, will result in a high number of such deployments.

Embodiments of the present invention are directed to transmitting power control for communications systems that access a radar spectrum. The communications systems may be coordinated through a centralized database in the event that the radar is located at a fixed known position. Embodiments of the present invention are also directed to a sensing capability of the evolved-Node-Bs/base stations. The sensing capability may be governed by CSAS. Embodiments of the present invention are also directed to a method of dynamically scheduling spectrum sensing by the CSAS among large numbers of secondary small-cell eNBs.

Faster and better communication-network access may be achieved by accessing the radar spectrum. When accessing the radar spectrum via a communication network, it is important to protect the radar from interference originating from the communication network. Without some coordination that organizes and limits the activities of the communication networks, these activities may negatively impact the radar, or may severely underutilize the available spectrum resources.

Further, if secondary networks are to coexist with radars, the secondary networks generally must be able to effectively detect transmission opportunities while protecting the integrity of the radar signal. Embodiments of the present invention may be directed to a system architecture that may be characterized as follows. First, the networks are spread over a wide area which will correspond to widely varying measurements of the radar signal. This issue may be tackled with distributed sensing. Second, the aggregated sensing data is processed at an aggregator and predictive results (regarding current radar behavior) may be distributed to other (nearby) networks to enable coexistence. In view of the above, implementing effective control of the sensing operations and forming accurate conclusions based on these measurements is important.

As described in more detail below, embodiments of the present invention provide a feasible and scalable method for performing proper resource allocation in terms of transmission power for each communication network. When the proper resource allocation is applied, the aggregate interference of the communication network can be kept within limits.

Embodiments of the present invention may utilize a location of a radar, acceptable interference levels, and a pointing direction of the radar to distribute a transmit-power budget to secondary nodes. The secondary nodes may transmit using the same spectrum.

Embodiments of the present invention may introduce a sensing capability at the small cell eNBs in order to coexist with radar signals in the 3.5 GHz band. Unlike the distributed nature of sensing in Wi-Fi, embodiments of the present invention may provide a centralized sensing mechanism, where the sensing may be performed in a distributed manner by small cells eNBs. The sensing duration and periodicity may be scheduled by a central authority, such as by the CSAS, for example.

Next, embodiments of the present invention may provide a database at the CSAS that includes the eNB Identifiers, pathloss (dB) between radar and an eNB with its corresponding eNB Identifier, and the eNB's (x, y) coordinates. The CSAS refers to the database entries prior to scheduling sensing durations and periodicity for each requesting eNB. Finally, with embodiments of the present invention, the sensing duration and periodicity scheduled by the CSAS may be a function of the pathloss between an eNB and radar, and also the angular distance (in degrees or radians) as described in more detail below.

Power-budget rings may refer to transmission regions that surround a radar. Specifically, power-budget rings may be defined as groups of LTE networks with a similar pathloss to the radar. Ring-radius selection may refer to a selecting of a size of the above-described transmission region using a transmitter density. Power Allocation may refer to an assigning of transmit powers to users within each transmission region, while satisfying interference constraints via resource allocation.

Embodiments of the present invention constrain the use of the radar spectrum (by communication networks) in order to constrain the amount of resulting interference that is experienced by the radar. In order to ensure that the radar's performance does not degrade to an unacceptable level, embodiments of the present invention may be configured to prevent the communication networks from exceeding a maximum threshold of interference. In one embodiment, operating in accordance with the constraint may mean configuring communication nodes (of a communication network) such that a resulting aggregate interference from the communication nodes (to the radar) is kept below a certain threshold to a high-degree of probability. For example, an example constraint may result in a configuration of the communication nodes such that the resulting aggregate interference remains below −80 dBm, 95% of the time.

With embodiments of the present invention, this threshold and the desired probability are known for a given radar, and the location of the radar is known. Also, the direction of the radar at any given time is also known. This information may be obtained from a centralized database that is connected to multiple radio-management services. Each radio-management service may, in turn, be connected to multiple small LTE networks within a given region.

With embodiments of the present invention, the radio-management service may be aware of the exact locations of the small LTE networks. The networks may have some type of back-haul link (for example, via the internet) to the radio-management service (RMS), and the networks are obliged to follow any recommendations/instructions provided by the radio-management service.

FIG. 1 illustrates a radar that is surrounded by a set of communication networks. FIG. 1 illustrates an example setup for a scenario where evolved Node Bs (eNBs) are distributed in some arbitrary fashion in a region that surrounds a radar. At the RMS, the following steps will generally take place. First, the RMS will form rings (concentric circles) that each encompass a set of small-cell networks. Next, the RMS will assign aggregate transmit powers to each ring using one of two methods, as described in greater detail below.

An eNB that wishes to use the spectrum will declare its location, and the eNB will also declare information such as load, channel quality, aggregate power, for example. This information may be used in the assignment of powers/transmit probabilities for each cell corresponding to the eNB.

In one embodiment of the present invention, the communication networks meet the following constraint:

$$P_{int} = \sum_{s \in S} 1_s P_{tx}(s) G_{tx}(s \text{ to } r) G_{rx}(r \text{ from } s) PL(s, r)$$

$$Pr(P_{int} > \gamma) > P_{outage}$$

In general, it may not be possible to efficiently perform (at scale) the assignment of transmission power for each eNB, such that the eNBs meet the above constraint. Therefore, embodiments of the present invention provide a divide-and-conquer approach. The number of rings to achieve the desired accuracy/complexity tradeoff is flexible and may be defined by the specific operator.

At each step, the outer radius of a previous ring determines the inner radius of a next ring. In order to determine the outer radius ($R_{outer}(i)$), the RMS takes the following steps. A maximum radius value is selected based on a pathloss distribution of the eNBs. For each ring, the RMS bases the maximum ($r_{max}$) radius value on a desired distribution of pathlosses within the ring. If the rings are made more compact (where the maximum radius is close to $R_{inner}(i)$), then the distribution of pathlosses within the ring will be more concentrated. Alternatively, a larger $r_{max}$ will result in a greater variation of pathloss within the ring.

Figure 2:
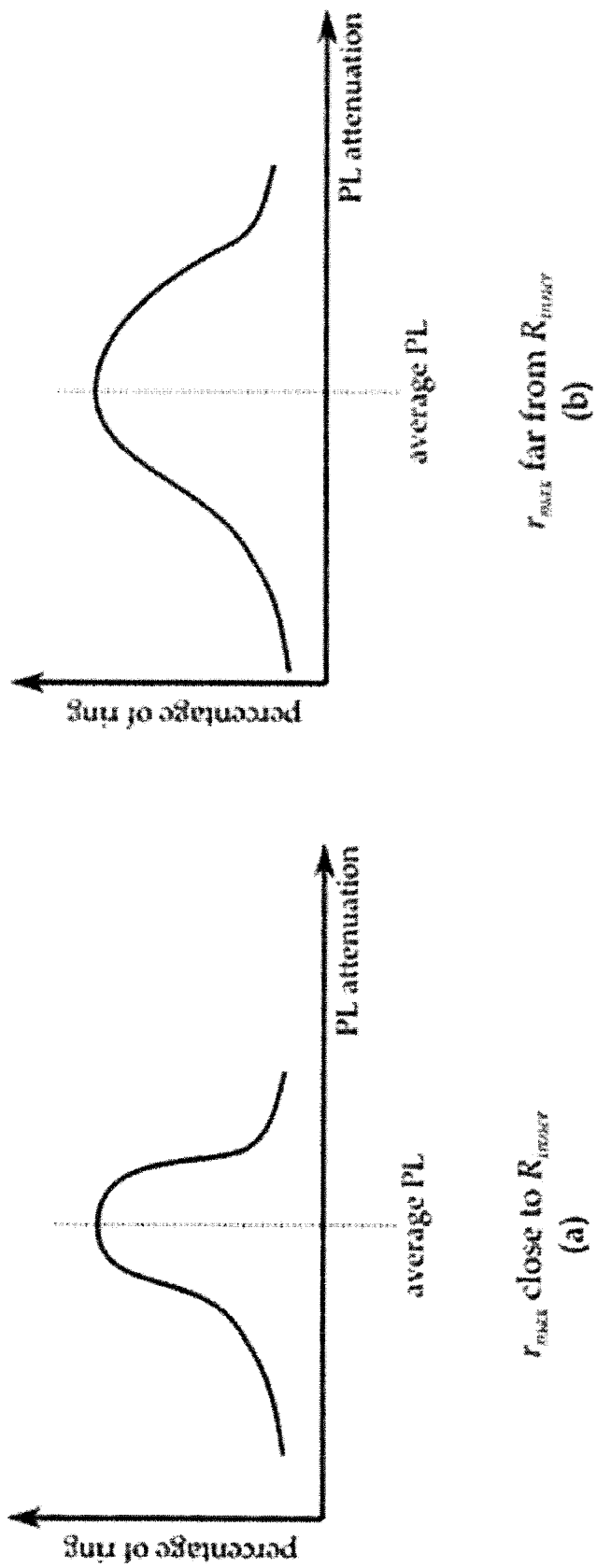
FIG. 2 illustrates a variation of pathloss as a function of ring size.

FIG. 2 illustrates a variation of pathloss as a function of ring size. FIG. 2 illustrates a variation of pathloss based on values of $r_{min}$ and $r_{max}$. In one embodiment, the RMS selects a number of small cell networks that are included in each ring based on a desired accuracy/complexity tradeoff, as described above. For each ring, the RMS expands the radius until the desired number of networks has been included in the ring or until the maximum radius of expansion has been achieved.

Figure 3:
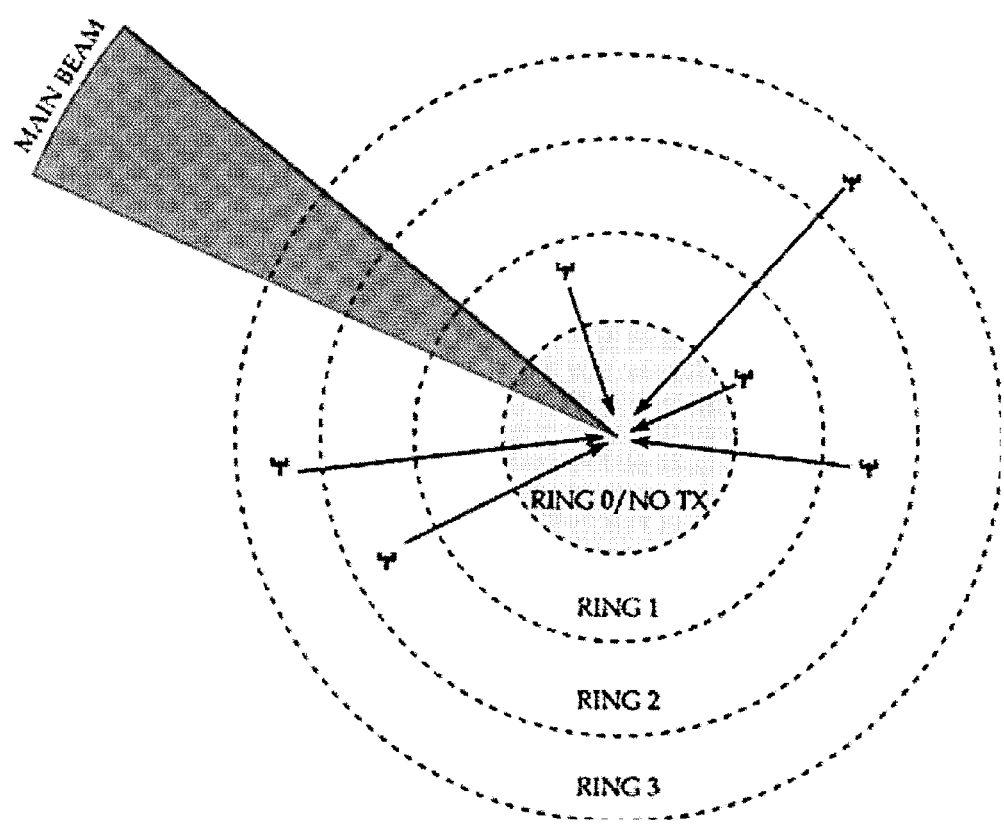
FIG. 3 illustrates the assignment of networks to groups/rings in accordance with one embodiment.

In general, the concentric rings may be arbitrarily defined or may be defined based on the needs of an allocation algorithm. One embodiment of the present invention may be directed at placing roughly the same number of eNBs in each ring. FIG. 3 illustrates the assignment of networks to groups/rings in accordance with one embodiment. For example, the transmit ring regions shown in FIG. 3 can be applied to FIG. 1, where each ring includes 2 networks.

In one embodiment, a no-transmit region (for communication networks) may exist close to the radar (a location corresponding to Ring 0). The inclusion of this region is optional and is not required for the operation of algorithms of the present invention.

In general, the total number of proposed rings, and the target number of networks per ring, are tunable algorithmic parameters that may be used to provide better performance at the cost of increased computation.

In one embodiment, once the rings have been established by the RMS, the RMS will divide a total power budget amongst the regions. When assigning transmit powers, embodiments of the present invention account for the location of a radar main beam and may require eNBs that are aligned with the main beam to remain quiet. Embodiments of the present invention provide two approaches for dividing the power budget among the rings.

$PL_i$ may refer to the average pathloss attenuation in linear scale ($\leq 1$) from ring i to the radar. $P_{tx,i}$ may refer to an allowed aggregate transmit power in ring i. $P_{int,i}$ may refer to a total interference contribution from ring i.

Certain embodiments of the present invention select the ring interference contributions such that the following condition is met.

$$\sum_i P_{int,i} \leq \gamma$$

Then, certain embodiments may approximate aggregate transmit power from ring i as:

$$P_{tx,i} = P_{int,i} \times PL_i^{-1}$$

In a first embodiment, the RMS will divide the power equally among the rings. In this case, eNBs that are further away from the radar will be allowed to transmit at higher powers. These eNBs are allowed to transmit at higher powers because their respective pathloss attenuations will generally be more severe. Embodiments of the present invention provide spatial advantage (FIG. 3) for those networks that are far away from the radar. Aggregate transmit power is assigned to each ring in the following way:

$$P_{tx,i} = \frac{\gamma}{N} \times PL_i^{-1}$$

In a second embodiment, the RMS will assign more interference power from the budget to the rings closer to the radar. This method attempts to provide fairness in terms of transmit power. Instead of assigning more power to eNBs that are far away, this embodiment attempts to assign the same powers to each eNB. In this case, the following condition may be used in the assignment of power:

$$P_{tx,i} = \gamma \times \frac{1}{\sum_j PL_j^{-1}}$$

Figure 4:
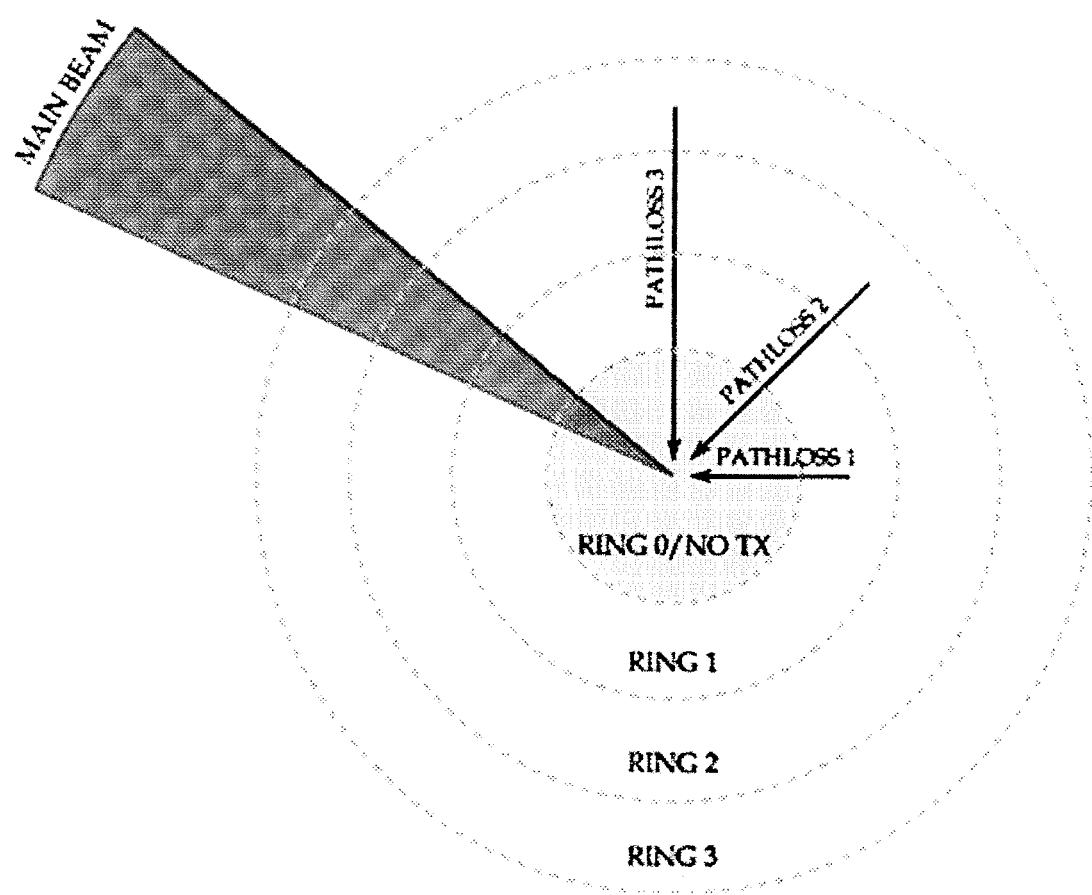
FIG. 4 illustrates the useful properties of a grouping for power allocation schemes in accordance with one embodiment.

FIG. 4 illustrates the useful properties of a grouping for power allocation schemes in accordance with one embodiment. FIG. 4 illustrates how each ring experiences different pathloss. To further illustrate the difference between the two methods, consider a 3-ring system where the pathlosses are: $PL_1=0.1$, $PL_2=0.01$, and $PL_3=0.001$, respectively. Assuming that a maximum tolerable interference to the radar is 1 W, as can be seen in the table below, the allocations may be different depending on the fairness/performance goals of each approach.

| Power Allocation using 2 methods | | | | |
|---|---|---|---|---|
| | Ring 1 | Ring 2 | Ring 3 | Total Interference |
| Pathloss Attenuation | 0.1 | 0.01 | 0.001 | — |
| Method 1 (Opp.) $P_{tx,i}$ | 3.3 W | 33 W | 333 W | 1 W |
| Method 2 (Fair) $P_{tx,i}$ | 9.009 W | 9.009 W | 9.009 W | 1 W |

In general, other approaches or mixtures of the above-listed methods could be used to provide a balance between fairness and maximizing throughput.

In view of the above, embodiments of the present invention propose an effective method to re-use available spectrum while protecting radars. An opportunity exists to access a vast quantity of previously underutilized spectrum. Embodiments of the present invention provide a scalable and flexible approach to assigning transmit powers to networks that desire to share access to spectrum with radars.

Further, in embodiments of the present invention, the CSAS may use the pathloss and angular distance information from the database in order to assign a sensing schedule for a requesting eNB. The angular distance between the line (connecting the radar and eNB) and the current location of the main beam is computed. For example, the angular distance may be 0 degrees, implying that the main lobe is located right on the eNB and the entire small cell, introducing severe interference to the LTE small cell. On the other hand, the angular distance may be 180 degrees, i.e., the main beam is located exactly opposite to the location of the eNB, imposing minimal interference to the eNB. The sensing schedule may include two parameters: (1) a sensing periodicity in its operating channel and (2) a sensing duration for each sensing period. If the angular distance is less than 10 degrees, the CSAS assigns sensing with a reduced periodicity (more frequent sensing), because the radar main beam is approaching the eNB. If the angular distance is greater than 10 degrees, the CSAS assigns an increased periodicity of sensing, because the radar main beam is moving away from the eNB.

Based on the pathloss of the eNB retrieved from the database, the CSAS may assign either a longer or a shorter sensing duration for each sensing period. The larger the value of the pathloss (the further away from the radar) is, the shorter the sensing duration, and vice versa. This relationship is due to the fact that a larger pathloss value generally results in better Signal-to-Interference-Plus-Noise-Ratio (SINR) values (hence, there is less interference). An increased sensing duration is scheduled by the CSAS to a requesting eNB, with a small pathloss value corresponding to that eNB identifier in the database. An increased sensing duration will generally lead to a high probability of detection and a low false alarm regarding the radar signal.

Figure 5:
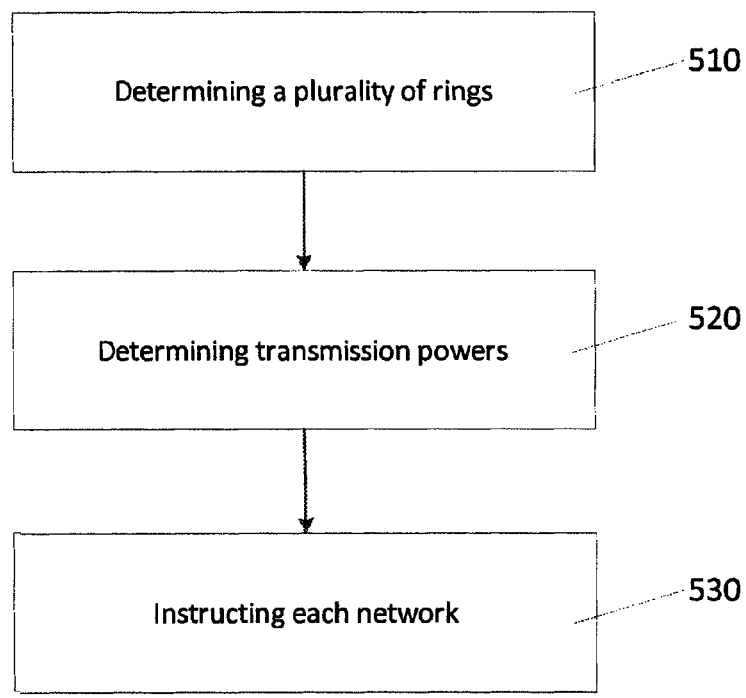
FIG. 5 illustrates a flow diagram of a method according to one embodiment.

FIG. 5 illustrates a logic flow diagram of a method according to certain embodiments of the invention. The method illustrated in FIG. 5 includes, at 510, determining a plurality of rings. The plurality of rings surround a radar. The plurality of rings encompass a plurality of networks surrounding the radar. The method includes, at 520, determining transmission powers corresponding to the plurality of rings. Each ring is associated with a determined transmission power. The method also includes, at 530, instructing each network of the plurality of networks to perform transmissions in accordance with the determined transmission powers. Each network is instructed to use the determined transmission power that corresponds to the ring which encompasses that network.

Figure 6:
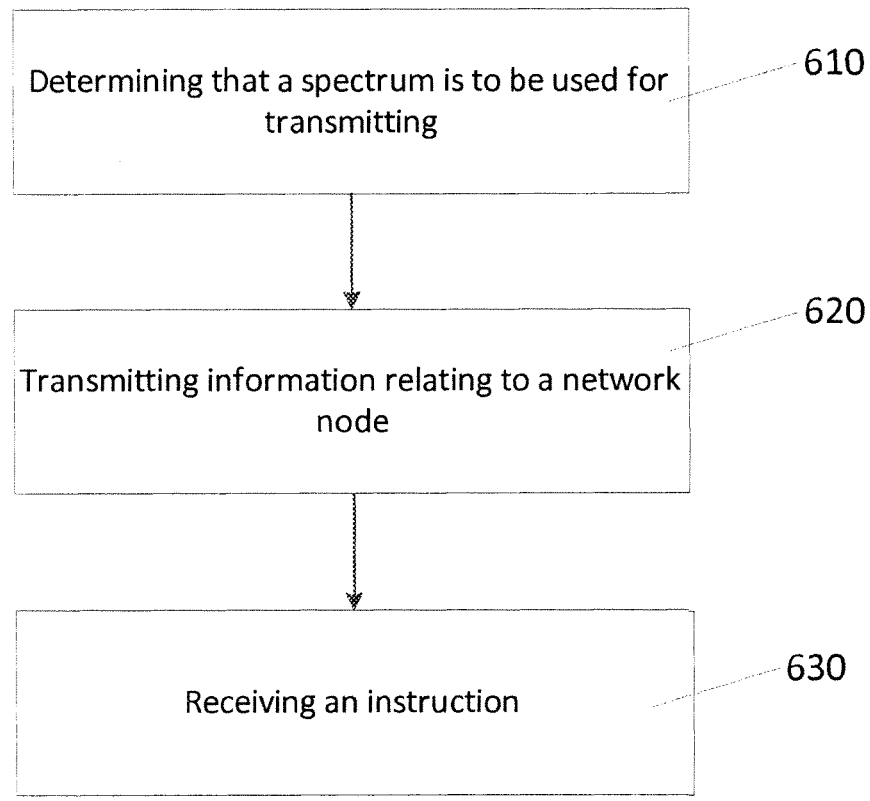
FIG. 6 illustrates a flow diagram of another method according to one embodiment.

FIG. 6 illustrates a logic flow diagram of a method according to certain embodiments of the invention. The method illustrated in FIG. 6 includes, at 610, determining that a spectrum is to be used for transmitting. The spectrum comprises a spectrum used by a radar. The method, at 620, includes transmitting information relating to a network node. The method, at 630, includes receiving an instruction to perform transmissions in accordance with a determined transmission power.

Figure 7:
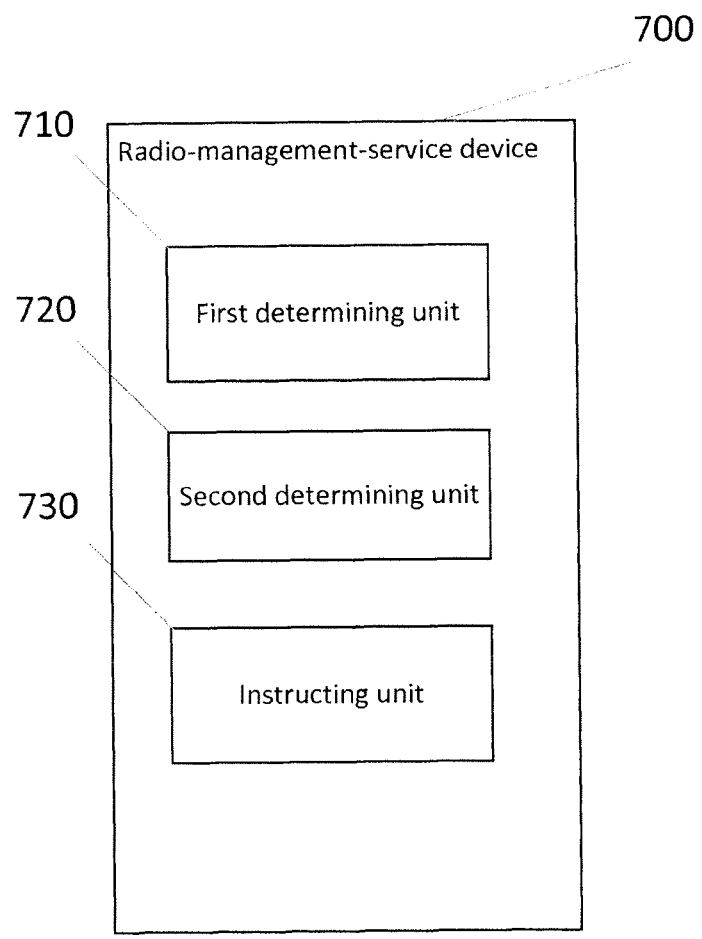
FIG. 7 illustrates an apparatus in accordance with an embodiment.

FIG. 7 illustrates an apparatus in accordance with one embodiment. Apparatus 700 includes a first determining unit 710 that determines a plurality of rings. The plurality of rings surround a radar, and the plurality of rings encompass a plurality of networks surrounding the radar. Apparatus 700 also includes a second determining unit 720 that determines transmission powers corresponding to the plurality of rings. Each ring is associated with a determined transmission power. Apparatus 700 also includes an instructing unit 730 that instructs each network of the plurality of networks to perform transmissions in accordance with the determined transmission powers. Each network is instructed to use the determined transmission power that corresponds to the ring which encompasses that network.

Figure 8:
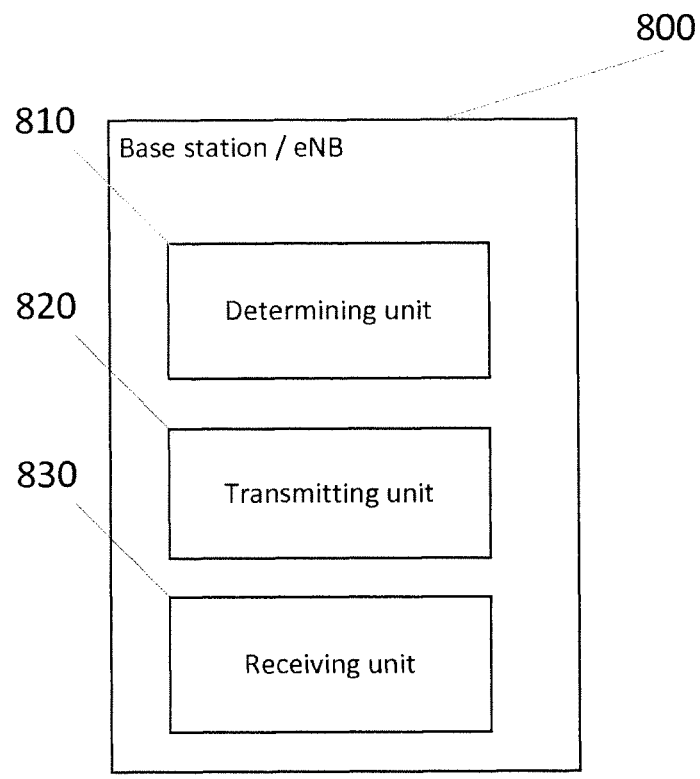
FIG. 8 illustrates an apparatus in accordance with another embodiment.

FIG. 8 illustrates an apparatus in accordance with one embodiment. The apparatus 800 includes a determining unit 810 that determines that a spectrum is to be used for transmitting. The spectrum comprises a spectrum used by a radar. Apparatus 800 also includes a transmitting unit 820 that transmits information relating to the network node. Apparatus 800 also includes a receiving unit 830 that receives an instruction to perform transmissions in accordance with a determined transmission power.

Figure 9:
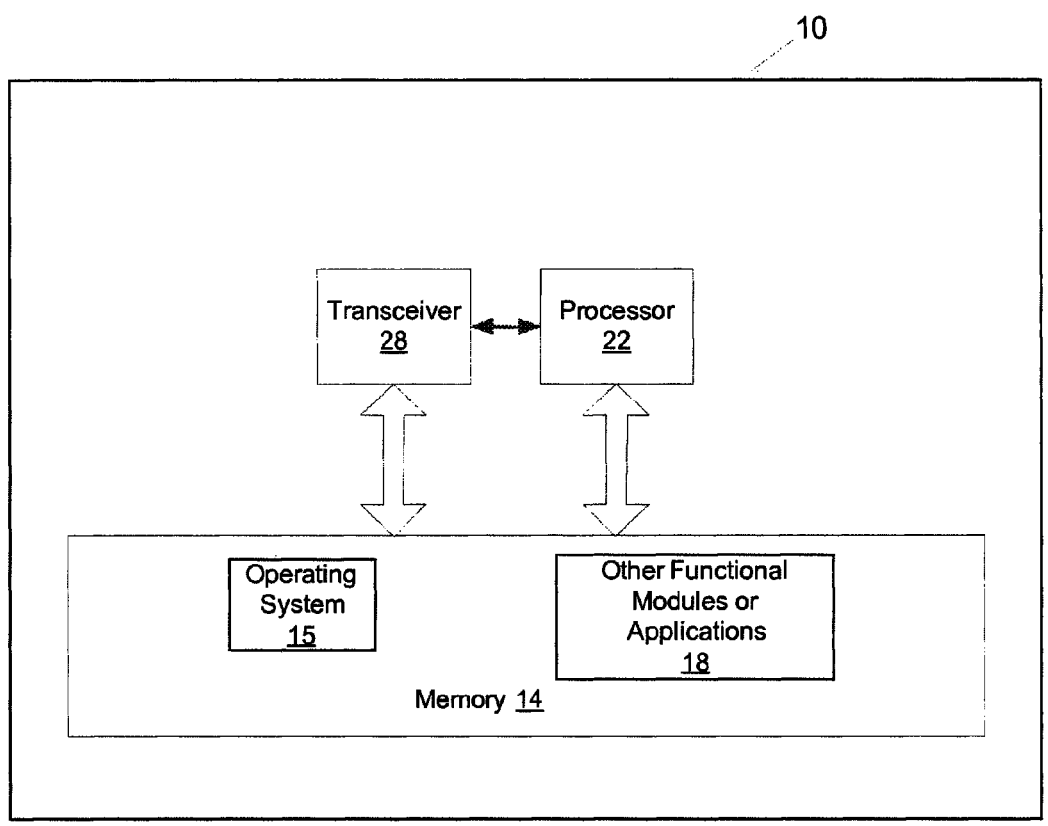
FIG. 9 illustrates an apparatus in accordance with another embodiment.

FIG. 9 illustrates an apparatus 10 according to embodiments of the invention. Apparatus 10 may be a device, such as a UE, for example. In other embodiments, apparatus 10 may be a base station, wireless-local-area-network access point, an evolved Node B, a wireless-local-area-network station, and/or any other type of access point, for example. Apparatus 10 may also include a network/management node that performs the function of a radio-management-service device, for example.

Apparatus 10 may include a processor 22 for processing information and executing instructions or operations. Processor 22 may be any type of general or specific purpose processor. While a single processor 22 is shown in FIG. 9, multiple processors may be utilized according to other embodiments. Processor 22 may also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 may be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In certain embodiments, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    determining, by a management node, a plurality of rings, wherein the plurality of rings surround a radar, and the plurality of rings encompass a plurality of networks surrounding the radar;
    determining transmission powers corresponding to the plurality of rings, wherein each ring is associated with a determined transmission power;
    instructing each network of the plurality of networks to perform transmissions in accordance with the determined transmission powers, wherein each network is instructed to use the determined transmission power that corresponds to the ring which encompasses that network; and assigning a sensing schedule for a requesting network of the plurality of networks, wherein the sensing schedule comprises a sensing duration and a sensing periodicity, and the assigning is at least in part based on a pathloss between the requesting network and the radar and an angular distance of the requesting network to the radar main beam.

2. The method according to claim 1, wherein the determining the plurality of rings comprises determining the plurality of rings by a radio-management-service device.

3. The method according to claim 1, wherein the determining the plurality of rings comprises determining a plurality of concentric rings.

4. The method according to claim 1, wherein the determining the plurality of rings comprises determining a maximum radius value of each ring, and the maximum radius value is based on a desired distribution of pathlosses within each ring.

5. The method according to claim 1, wherein the determining the transmission powers corresponding to the plurality of rings comprises determining transmission powers that are equal to each other or assigning higher transmission power to rings closer to the radar.

6. A computer program product, embodied on a non-transitory computer readable medium, the computer program product configured to control a processor to perform a process, comprising:
determining, by a management node, a plurality of rings, wherein the plurality of rings surround a radar, and the plurality of rings encompass a plurality of networks surrounding the radar;
determining transmission powers corresponding to the plurality of rings, wherein each ring is associated with a determined transmission power;
instructing each network of the plurality of networks to perform transmissions in accordance with the determined transmission powers, wherein each network is instructed to use the determined transmission power that corresponds to the ring which encompasses that network; and
assigning a sensing schedule for a requesting network of the plurality of networks, wherein the sensing schedule comprises a sensing duration and a sensing periodicity, and the assigning is at least in part based on a pathloss between the requesting network and the radar and an angular distance of the requesting network to the radar main beam.

7. An apparatus, comprising:
at least one processor; and
at least one memory including computer program code, the at least one memory and the computer program code configured, with the at least one processor, to cause the apparatus at least to
determine a plurality of rings, wherein the plurality of rings surround a radar, and the plurality of rings encompass a plurality of networks surrounding the radar;
determine transmission powers corresponding to the plurality of rings, wherein each ring is associated with a determined transmission power;
instruct each network of the plurality of networks to perform transmissions in accordance with the determined transmission powers, wherein each network is instructed to use the determined transmission power that corresponds to the ring which encompasses that network; and
assign a sensing schedule for a requesting network of the plurality of networks, wherein the sensing schedule comprises a sensing duration and a sensing periodicity, and the assigning is at least in part based on a pathloss between the requesting network and the radar and an angular distance of the requesting network to the radar main beam.

8. The apparatus according to claim 7, wherein the apparatus comprises a radio-management-service device.

9. The apparatus according to claim 7, wherein the determining the plurality of rings comprises determining a plurality of concentric rings.

10. The apparatus according to claim 7, wherein the determining the plurality of rings comprises determining a maximum radius value of each ring, and the maximum radius value is based on a desired distribution of pathlosses within each ring.

11. The apparatus according to claim 7, wherein the determining the transmission powers corresponding to the plurality of rings comprises determining transmission powers that are equal to each other or assigning higher transmission power to rings closer to the radar.

12. A computer program product, embodied on a non-transitory computer readable medium, the computer program product configured to control a processor to perform a process, comprising:
determining, by a network node, that a spectrum is to be used for transmitting, wherein the spectrum comprises a spectrum used by a radar;
transmitting information relating to the network node;
receiving an instruction to perform transmissions in accordance with a determined transmission power; and
receiving a sensing schedule from a management node, wherein the sensing schedule comprises a sensing duration and a sensing periodicity that are at least in part based on a pathloss between the network node and the radar and an angular distance of the network node to the radar main beam.

13. A method, comprising:
determining, by a network node, that a spectrum is to be used for transmitting, wherein the spectrum comprises a spectrum used by a radar;
transmitting information relating to the network node;
receiving an instruction to perform transmissions in accordance with a determined transmission power; and
receiving a sensing schedule from a management node, wherein the sensing schedule comprises a sensing duration and a sensing periodicity that are at least in part based on a pathloss between the network node and the radar and an angular distance of the network node to the radar main beam.

14. The method of claim 13, wherein the transmitting information relating to the network node comprises transmitting at least one of an identifier of the network node, a pathloss from the network node to the radar, coordinates of the network node, a load, a channel quality, and an aggregate power.

15. The method of claim 13, wherein the determining that a spectrum is to be used for transmitting comprises determining by a base station, a wireless-local-area-network access point, an evolved Node B, or a wireless-local-area-network station.

16. An apparatus, comprising:
at least one processor; and at least one memory including computer program code, the at least one memory and the computer program code configured, with the at least one processor, to cause the apparatus at least to determine that a spectrum is to be used for transmitting, wherein the spectrum comprises a spectrum used by a radar;

transmit information relating to the apparatus;

receive an instruction to perform transmissions in accordance with a determined transmission power; and receive a sensing schedule from a management node, wherein the sensing schedule comprises a sensing duration and a sensing periodicity that are at least in part based on a pathloss between the apparatus and the radar and an angular distance of the apparatus to the radar main beam.

17. The apparatus of claim 16, wherein the apparatus comprises a base station, a wireless-local-area-network access point, an evolved Node B, or a wireless-local-area-network station.

18. The apparatus of claim 16, wherein the transmitting information relating to the apparatus comprises transmitting at least one of an identifier of the network node, a pathloss from the network node to the radar, coordinates of the network node, a load, a channel quality, and an aggregate power.

* * * * *